United States Patent [19]
Yamada et al.

[11] Patent Number: 5,627,725
[45] Date of Patent: May 6, 1997

[54] DUSTPROOF STRUCTURE FOR AN ELECTRONIC APPARATUS HAVING A DISPLAY PORTION

[75] Inventors: Hiroshi Yamada; Masataka Suzuki, both of Tokyo, Japan

[73] Assignee: NEC Corporation, Tokyo, Japan

[21] Appl. No.: 550,659

[22] Filed: Oct. 31, 1995

[30] Foreign Application Priority Data

Oct. 31, 1994 [JP] Japan .................. 6-266910

[51] Int. Cl.$^6$ .................. G06F 1/16; H05K 5/06
[52] U.S. Cl. .................. 361/681; 345/905
[58] Field of Search .................. 361/681, 679; 345/50, 905; 359/40, 80, 81, 83

[56] References Cited

U.S. PATENT DOCUMENTS

| 4,260,224 | 4/1981 | Takayama | 359/53 |
| 4,514,920 | 5/1985 | Shafrir et al. | 40/448 |
| 4,642,627 | 2/1987 | Hodsdon | 345/50 |

FOREIGN PATENT DOCUMENTS

| 2674295 | 9/1992 | France . |
| 2190529 | 11/1987 | United Kingdom . |

*Primary Examiner*—Leo P. Picard
*Assistant Examiner*—Lynn D. Feild
*Attorney, Agent, or Firm*—Scully, Scott, Murphy & Presser

[57] ABSTRACT

A dustproof structure for an electronic apparatus having a display portion, particularly a data display radio pager, is disclosed. The structure can be produced and assembled with a minimum of accuracy and can be assembled with ease.

5 Claims, 5 Drawing Sheets

5,627,725

DUSTPROOF STRUCTURE FOR AN ELECTRONIC APPARATUS HAVING A DISPLAY PORTION

BACKGROUND OF THE INVENTION

The present invention relates to a dustproof structure for an electronic apparatus having a display portion and, more particularly, to a dustproof structure for the casing of a data display radio pager.

Data display radio pagers and other electronic apparatuses having a display portion are extensively used today. This kind of apparatus has a casing formed with a window, a screen closing the window, and a display portion received in the casing and facing the screen. The display portion is implemented by a display device capable of displaying, e.g., characters. Usually, a generally O-shaped cushion is interposed between the screen and the display portion in order to define a hermetically sealed chamber. The cushion prevents dust entered the casing from reaching the sealed space. However, when a pressure acting on the cushion is low or zero, dust is apt to reach the space. On the other hand, when the pressure is high, it is likely to causes a circuit board to bend. Therefore, an optimal pressure must be selected which acts on the cushion. It follows that all the constituent parts of the apparatus must be produced and assembled with high accuracy.

SUMMARY OF THE INVENTION

It is, therefore, an object of the present invention to provide a dustproof structure for an electronic apparatus having a display portion, and requiring a minimum of accuracy in the event of production and assembly and easy to assemble.

A dustproof structure for an electronic apparatus having a display portion of the present invention has a box-like casing having an open end. The casing is formed with a window at the center thereof and accommodates the display portion therein. A screen closes the window of the casing. A cover removably closes the open end of the casing while maintaining the display portion at a predetermined distance from the screen. A guide wall extends from the inner periphery of the casing around the window, and surrounds the display portion. An elastic member hermetically seals a gap between the guide wall and the display portion.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1A:
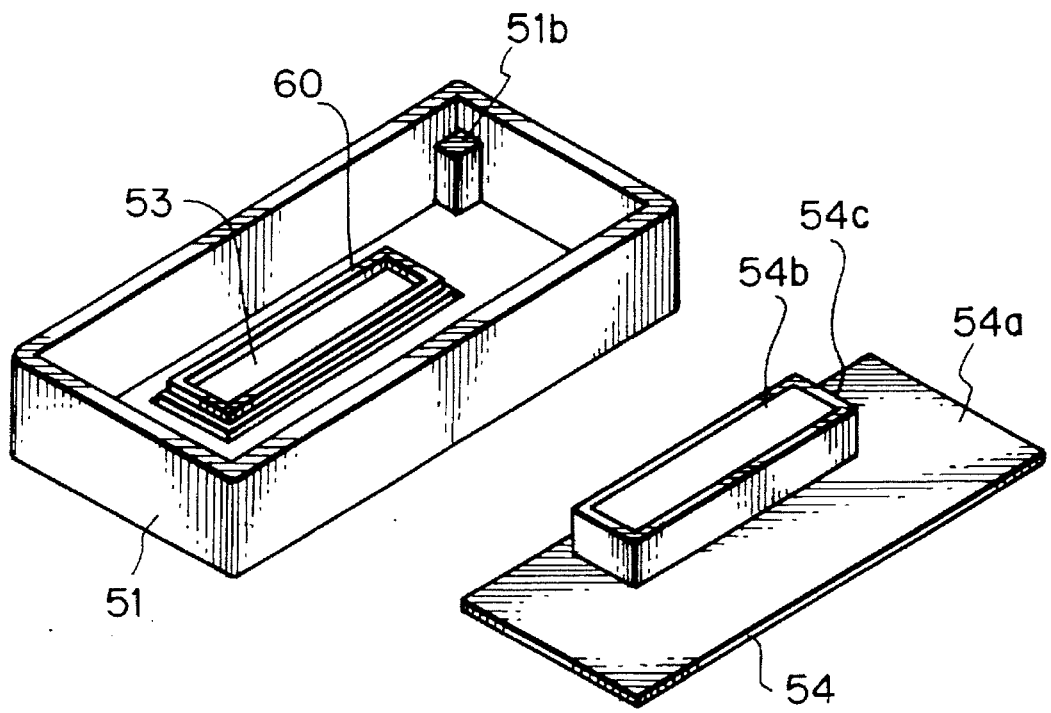
FIG. 1A is a perspective view showing a conventional electronic apparatus having a cushion fitted on a casing thereof.
Figure 1B:
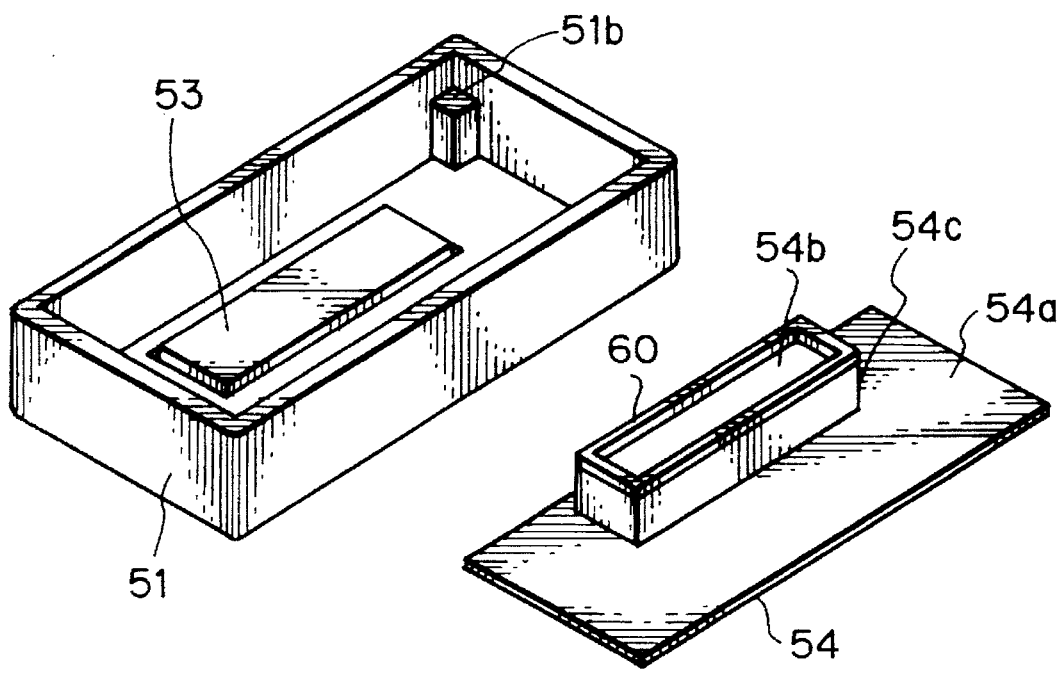
FIG. 1B is a view similar to FIG. 1A, showing the conventional apparatus having the cushion fitted on a display portion thereof.

To better understand the present invention, a brief reference will be made to a conventional dustproof structure for an electronic apparatus having a display portion, shown in FIGS. 1A, 1B and 2. As shown in FIGS. 1A and 1B, the apparatus has a box-like casing 51 having a screen, or window, 53 at the center thereof. A circuit assembly 54 is received in the casing 51. A generally O-shaped cushion 60 is interposed between the circuit assembly 54 and the screen 53. The circuit assembly 54 is made up of a circuit board 54a, a display portion 54b provided on the circuit board 54a, and a cover portion 54c affixing the display portion 54b to the circuit board 54a.

Figure 2:
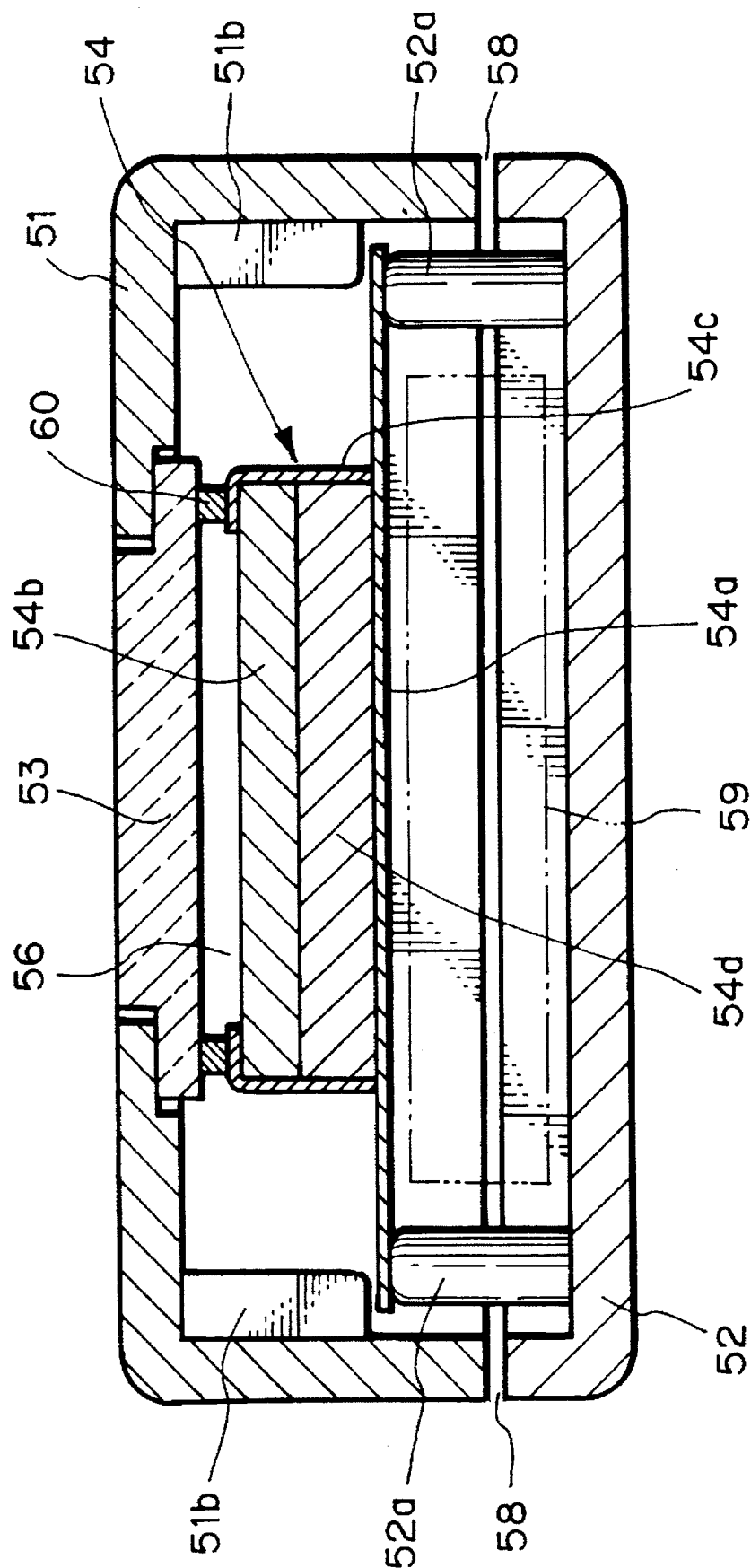
FIG. 2 is a vertical section of the conventional apparatus shown in FIGS. 1A and 1B.

FIG. 2 shows the above constituents of the apparatus in an assembled condition. As shown, a cover 52 closes the open end of the casing 51. In practice, the cover 52 is removable from the casing 51 in the event of, e.g., the replacement of a battery. Lugs 51b protrude from the inner walls of the casing 51 while lugs 52a protrude from the bottom of the cover 52. The circuit assembly 54 is held between the lugs 51b and 52a. Electric parts 59 are disposed between the substrate 54a and the cover 52 and control the entire apparatus. The display portion 54b faces the screen 53 with the intermediary of the cushion 60. The cushion 60 is elastically deformed by a pressure acting between the screen 53 and the display portion 54b, so that a hermetically sealed chamber 56 is formed between the screen 53 and the display portion 54b. In this configuration, dust entered the apparatus via a gap 58 between the casing 51 and the cover 52 is prevented from reaching the chamber 56. This maintains the screen 53 clean at all times.

However, when the pressure acting on the cushion 60 is low or zero, dust from the gap 58 reaches the display portion 54b. On the other hand, when the pressure is high, it causes the circuit board 54a to bend and thereby effects the operation of the circuitry provided on the board 54a. Therefore, the prerequisite with the conventional apparatus is that all the constituent parts be produced and assembled with high accuracy. Moreover, the high pressure causes a part of the cushion 60 to bulge out onto the screen 53 due to the excessive deformation of the cushion 60 and, in addition, undesirably accentuates the gap 58 between the casing 51 and the cover 58, thereby deteriorating the appearance.

Figure 3A:
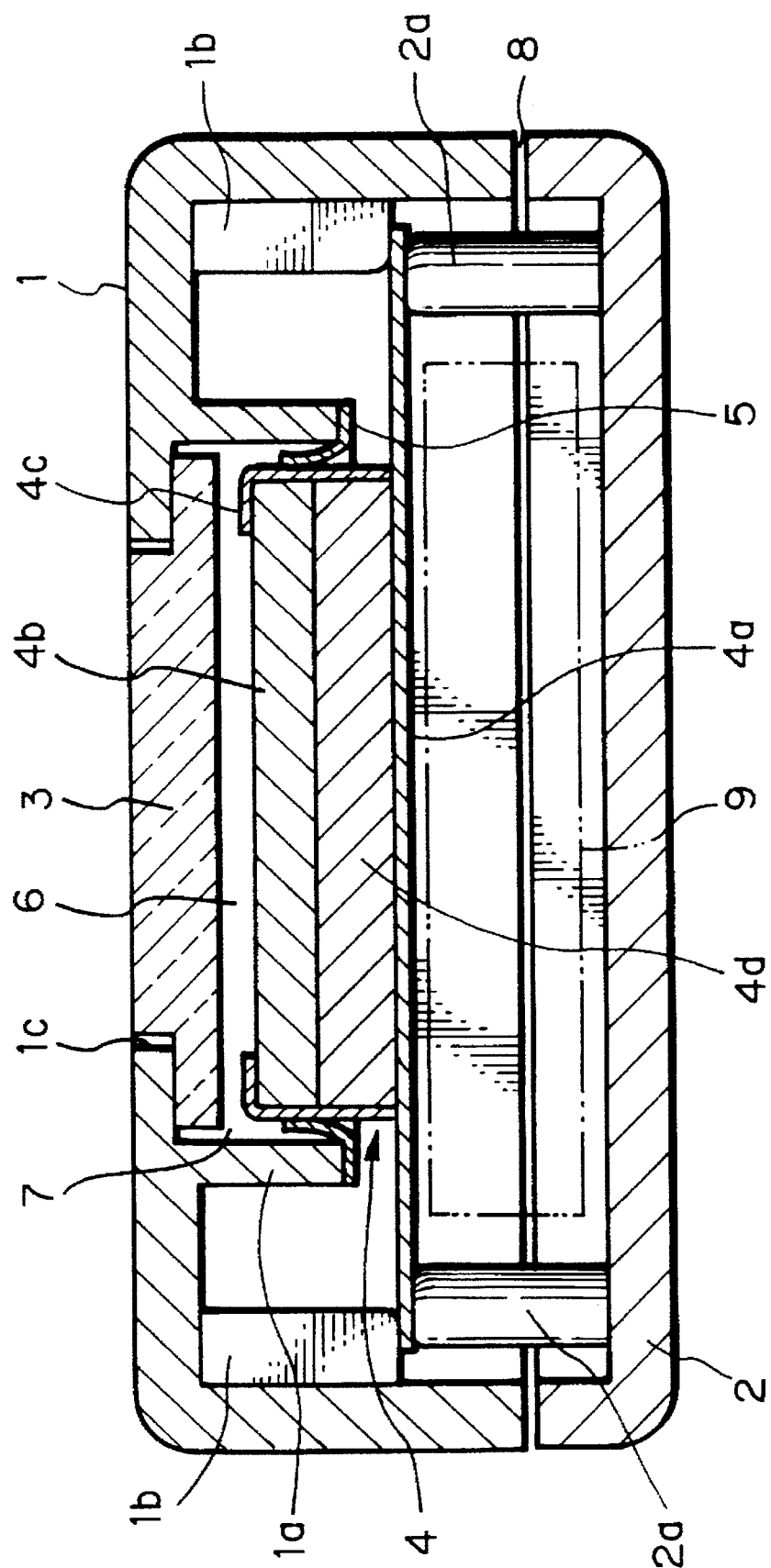
FIG. 3A is a vertical section of an electronic apparatus embodying the present invention.

A reference will be made to FIG. 3A for describing a dustproof structure embodying the present invention. As shown, an electronic apparatus has a box-like casing 1 having an open end, and a cover 2 covering the open end of the casing 1. A circuit assembly 4 is received in the casing 1. Electric parts 9 are interposed between the circuit assembly 4 and the lid 2.

The casing 1 is formed with a rectangular window 1c at the center thereof. A screen 3 is sized slightly greater than the window 1c and hermetically closes the window 1c inside of the casing 1. The screen 3 is affixed to the inner periphery of the casing 1 by, e.g., adhesive. Lugs 1b protrude from the inner periphery of the casing 1 at the four corners of the casing 1. In the illustrative embodiment, the lugs 1b each has a rectangular cross-section and has a length smaller than the height of the casing 1.

The cover 2 has a tray-like configuration matching the open end of the casing 1. Cylindrical upright posts 2a extend from the bottom of the cover 2 at positions corresponding to the lugs 1b of the casing 1. The lugs 1b and posts 2a cooperate to retain a circuit board 4a within the casing 1. The cover 2 is removably mounted to the casing 1 by, e.g., a conventional lug and recess scheme.

The circuit assembly 4 has, in addition to the circuit board 4a, a light base 4d and a display portion 4b sequentially stacked on the circuit board 4a. In this embodiment, the light base 4d and display portion 4b are fixed in place on the circuit board 4a by a retainer 4c at the sides and a part of the top thereof. The circuit assembly 4 is held by the posts 2a and lugs 1b such that the display portion 4b faces the screen 3. A space 6 is defined between the screen 3 and display portion 4b and has a width determined by the height of the lugs 1b.

A generally O-shaped guide wall 1a extends from the inner periphery of the casing 1 and surrounds the display portion 4b. The gap between the guide wall 1a and the display portion 4b is sealed by an elastic member. In the illustrative embodiment, the elastic member is implemented as a thin rubber sheet 5 having a uniform thickness. A hole 5b (FIG. 4A) is formed through the center of the rubber sheet 5 in order to receive the display portion 4b. In the embodiment, the hole 5b is shaped complementarily to the display portion 4b, but the former is sized slightly smaller than the latter. The sheet 5 is adhered to the end of the guide wall 1a along the outer edges thereof. When the display portion 4b is inserted into the hole 5b, it entrains the inner edges of the rubber sheet 5 toward the screen 3. As a result, the space 6 is hermetically sealed.

Figure 4A:
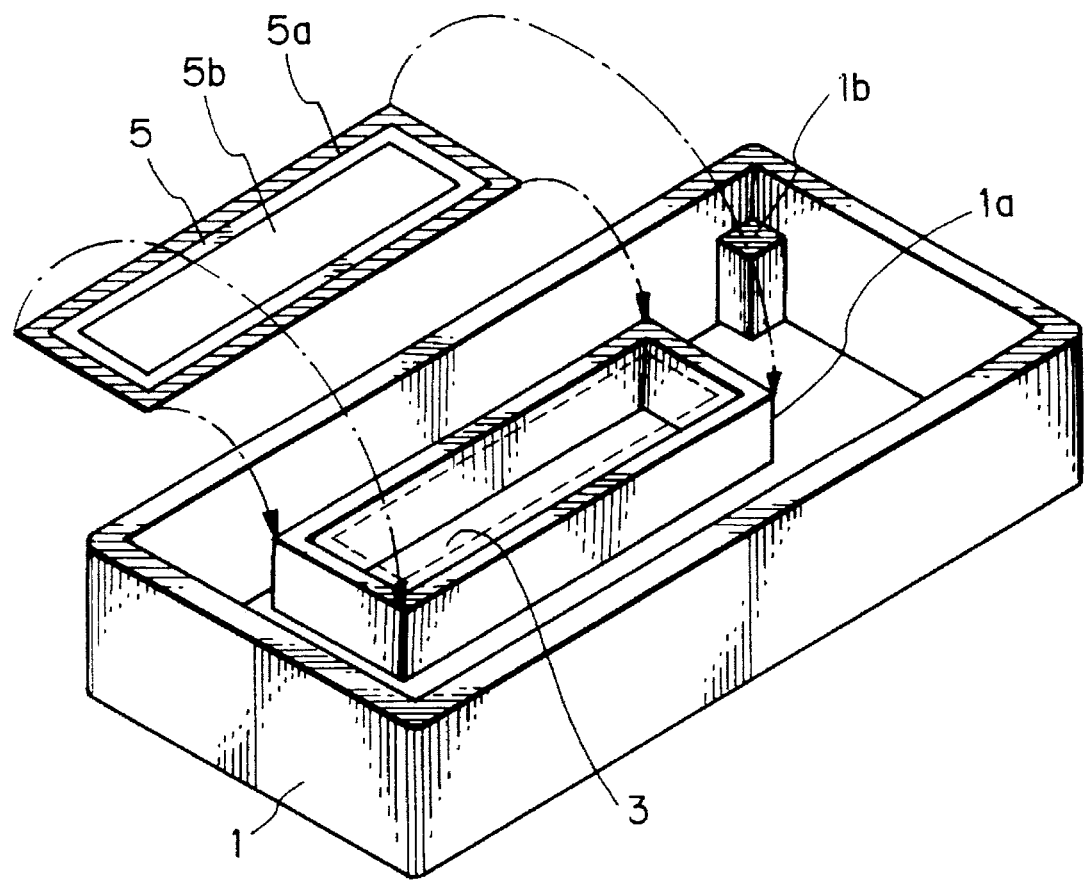
FIG. 4A is a perspective view showing a casing included in the embodiment of FIG. 3A or 3B and in a position in which the open end of the casing faces upward.
Figure 4B:
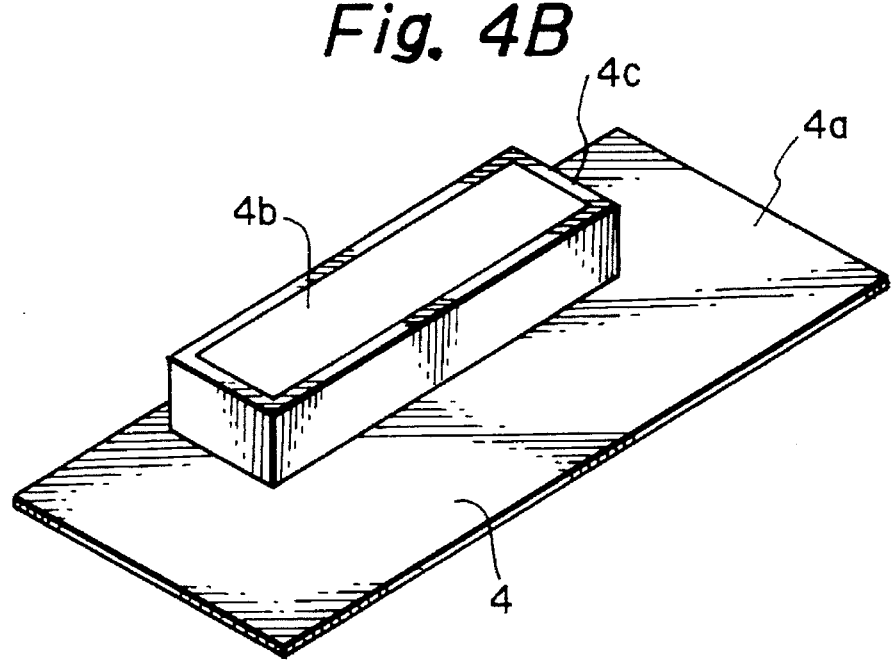
FIG. 4B is a perspective view of a circuit assembly to be received in the casing of FIG. 4A.

A procedure for assembling the constituents of the embodiment will be described with reference to FIGS. 4A and 4B. FIG. 4A shows the casing 1 in a position in which the open end thereof faces upward. First, the screen 3 is adhered to the casing 1. Then, the rubber sheet 5 applied with adhesive 5a along the outer edges thereof is adhered to the end of the guide wall 1a. The hole 5b of the rubber sheet 5 is smaller than the guide wall 1a, as indicated by a phantom line in FIG. 4A. The circuit assembly 4 shown in FIG. 4B is mounted to the casing 1 by having the display portion 4b thereof inserted into the hole 5b toward the screen 3. Because the display portion 4b is larger than the hole 5b, friction acts between the sides of the retainer 4c and the inner edges of the rubber sheet 5. As a result, the inner edges of the sheet 5 are elastically deformed toward the screen 3. After the circuit board 4a has abutted against the lugs 1b of the casing 1, the electric parts 9 are mounted to the rear of the board 4a. Finally, the cover 2 is attached to the casing 1.

In the above embodiment, the sheet 5 hermetically seals the space 6 in close contact with the sides of the display portion 4b. The sheet 5, therefore, does not exert any pressure in the vertical direction of the casing 1. This frees the circuit assembly 4 and electric parts 9 disposed in the casing 1 from the previously stated problems. Hence, it is possible to increase the pressure to be exerted by the sheet 5 and, therefore, to form a hermetic chamber while accommodating dimensional errors. It follows that the accuracy required of the constituent parts as to production and assembly is eased, thereby reducing the production cost.

The sheet 5 hermetically seals the space 6 along all the sides of the display portion 4b. Hence, even when the circuit assembly 4 is slightly dislocated in the right-and-left direction, the portion of the sheet 5 where the pressure is lower successfully follows the display portion 4b, insuring the hermetically sealed chamber.

Figure 3B:
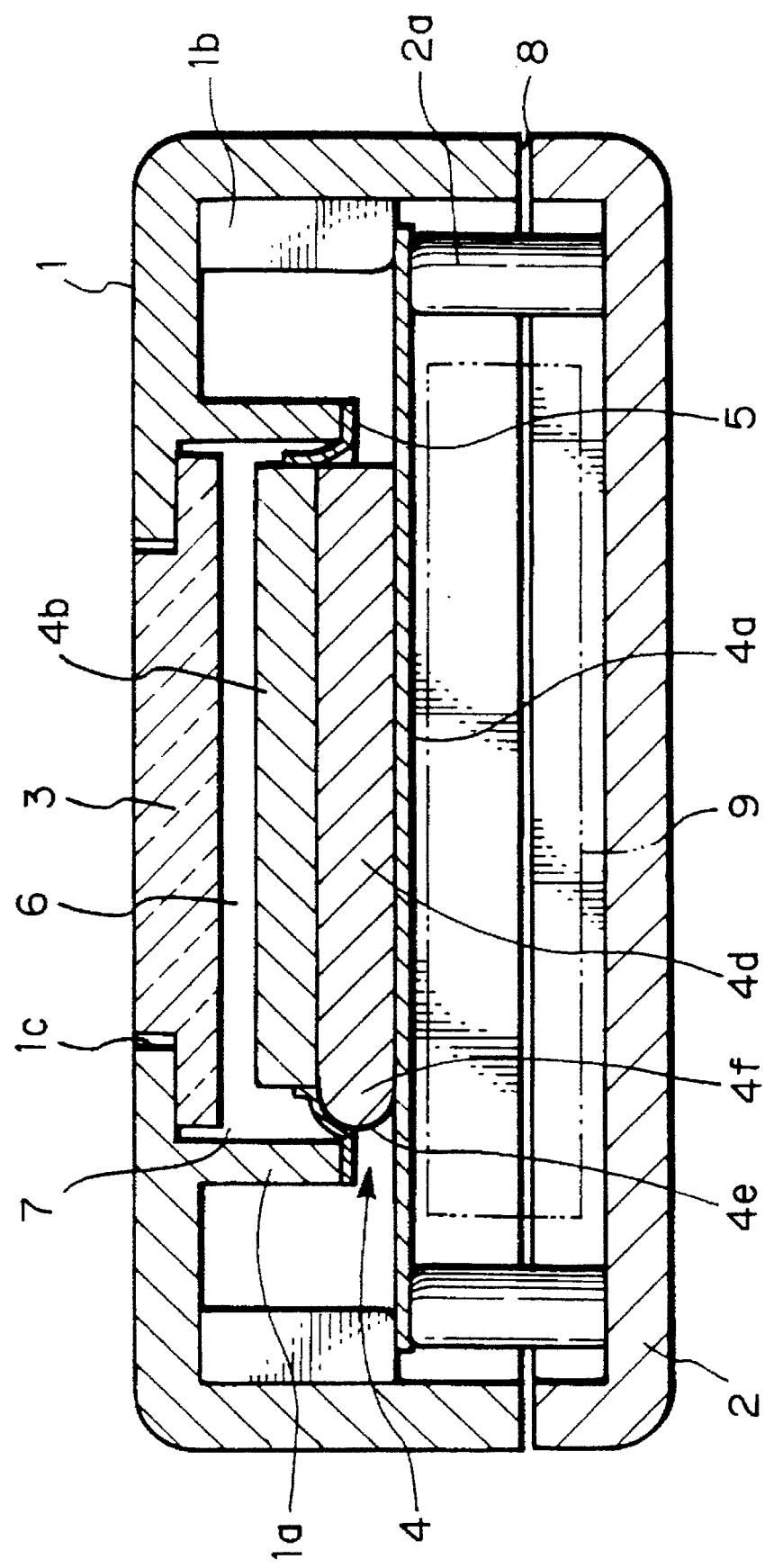
FIG. 3B is a vertical section showing an alternative embodiment of the present invention.

FIG. 3B shows an alternative embodiment of the present invention similar to the previous embodiment except for the configuration of the circuit assembly 4. In FIG. 3B, the same or similar constituent parts as or to the parts shown in FIG. 3A are designated by the same reference numerals, and a detailed description thereof will not be made in order to avoid redundancy. As shown, the rubber sheet 5 closely contacts the sides of the circuit assembly 4 even when they are provided with a different configuration; that is, the sheet is applicable to the circuit assembly 4 without regard to the configuration of the assembly 4. Specifically, in FIG. 3B, the light base 4d intervening between the display portion 4b and the circuit board 4a has an arcuate end 4f, and a conductive film 4e covering the arcuate end 4f for setting up electrical conduction between the display portion 4b and the circuit board 4a. The sheet 5 contacts the film 4e and plays the role of a cover at the same time. Further, because the pressure of the sheet or elastic member 5 is not transferred to the cover 2, the gap between the casing 1 and the cover 2 is prevented from being increased and reduces the amount of dust to enter the casing 1. This further enhances the dustproof effect.

During the assembly, the sheet 5 is simply adhered to the guide wall 1a, and then the display portion 4b of the circuit assembly 4 is inserted into the hole 5b of the sheet 5. At this instant, the display portion 4b is automatically brought to an optimal position due to the pressure of the sheet 5. This makes it needless to mount the circuit assembly 4 while measuring the position thereof, thereby simplifying the assembling steps and enhancing efficient operation.

In summary, it will be seen that the present invention provides a dustproof structure for an electronic apparatus having a display portion, and having various unprecedented advantages as enumerated below.

(1) An elastic member hermetically seals a space in close contact with the sides of a display portion included in a circuit assembly. The elastic member, therefore, does not exert any pressure in the vertical direction of a casing. This frees the circuit assembly and electric parts disposed in the casing from adverse influence. Hence, it is possible to increase the pressure to be exerted by the elastic member and, therefore, to form a hermetically sealed chamber while accommodating dimensional errors. It follows that the accuracy required of the constituent parts as to production and assembly is eased, thereby reducing the production cost.

(2) The elastic member hermetically seals the space along all the sides of the display portion. Hence, even when the circuit assembly is slightly dislocated in the right-and-left direction, the portion of the elastic member where the pressure is lower successfully follows the display portion, insuring the hermetically sealed chamber.

(3) Because the pressure of the elastic member is not transferred to a cover covering the casing, the gap between the casing and the cover is prevented from being increased and reduces the amount of dust to enter the casing. This further enhances the dustproof effect.

(4) The elastic member is formed with a hole. The hermetic space can be formed only if the display portion is inserted into the hole of the elastic member.

(5) The hole of the elastic member is smaller than the inserting surface of the display portion. Hence, after the display portion has been inserted into the hole, a sufficient pressure acts between the display portion and the guide wall. The pressure automatically brings the display portion to a predetermined position while forming the hermetic chamber. Thus, a desirable dustproof structure is achievable with simple assembly.

(6) The elastic member is simply adhered to the guide wall, and then the display portion is inserted into the hole. This further promotes easy assembly and efficient operation.

(7) When the elastic member is implemented by a rubber sheet, it deforms while accurately following the configuration of the circuit assembly. Hence, the elastic member is applicable to the circuit assembly without regard to the configuration of the circuit assembly.

Various modifications will become possible for those skilled in the art after receiving the teachings of the present disclosure without departing from the scope thereof. For example, the rubber sheet 5 may be replaced with a member implemented by sponge or flexible vinyl. In addition, such an elastic member 5 may be positioned between the guide wall 1a and the display portion 4b, if desired.

What is claimed is:

1. A dustproof structure for an electronic apparatus having a display portion, comprising:

a box-like casing having an open end, and formed with a window at a center thereof, and accommodating said display portion therein;

a screen closing said window of said casing;

a cover removably closing said open end of said casing while maintaining said display portion at a predetermined distance from said screen;

a guide wall extending from an inner periphery of said casing around said window, and surrounding said display portion; and an elastic member hermetically sealing a gap between said guide wall and said display portion, said elastic member comprising a thin sheet formed with a hole at a center thereof for allowing said display portion to be inserted thereinto, inner edges of said sheet defining said hole, said hole of said elastic member being sized slightly smaller than an inserting surface of said display portion, the inner edges of said sheet being elastically deformed toward said screen when said display portion is inserted thereinto to form a hermetically sealed chamber between said screen at said display.

2. A structure as claimed in claim 1, wherein said elastic member comprises a thin sheet formed with a hole at a center thereof for allowing said display portion to be inserted thereinto.

3. A structure as claimed in claim 2, wherein said hole of said elastic member is sized slightly smaller than an inserting surface of said display portion.

4. A structure as claimed in claim 2, wherein said elastic member is adhered to said guide wall at outer edges thereof.

5. A structure as claimed in claim 2, wherein said elastic member comprises a rubber sheet.

\* \* \* \* \*